(12) United States Patent
Boss et al.

(10) Patent No.: US 10,735,463 B2
(45) Date of Patent: Aug. 4, 2020

(54) VALIDATING COMMANDS FOR HACKING AND SPOOFING PREVENTION IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Gregory J. Boss, Saginaw, MI (US); John E. Moore, Jr., Pflugerville, TX (US); Andrew R. Jones, Round Rock, TX (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 16/130,321

(22) Filed: Sep. 13, 2018

(65) Prior Publication Data

US 2020/0092322 A1  Mar. 19, 2020

(51) Int. Cl.
| | |
|---|---|
| *G06F 15/16* | (2006.01) |
| *H04L 29/06* | (2006.01) |
| *H04L 29/08* | (2006.01) |
| *G06N 20/00* | (2019.01) |

(52) U.S. Cl.
CPC ......... *H04L 63/1466* (2013.01); *G06N 20/00* (2019.01); *H04L 67/18* (2013.01); *H04L 67/22* (2013.01)

(58) Field of Classification Search
CPC ..... H04L 63/1466; H04L 67/18; H04L 67/22; G06N 20/00
See application file for complete search history.

(56) References Cited

U.S. PATENT DOCUMENTS

| | | | |
|---|---|---|---|
| 6,446,076 | B1 | 9/2002 | Burkey et al. |
| 7,536,374 | B2 | 5/2009 | Au |
| 8,180,779 | B2 | 5/2012 | Horowitz et al. |
| 8,645,137 | B2 | 2/2014 | Bellegarda et al. |
| 9,031,845 | B2 | 5/2015 | Kennewick et al. |
| 9,250,703 | B2 | 2/2016 | Hernandez-Abrego et al. |
| 2011/0231188 | A1 | 9/2011 | Kennewick et al. |
| 2018/0144255 | A1* | 5/2018 | Shams ................. G06N 5/022 |
| 2019/0115017 | A1* | 4/2019 | Sim ..................... G06F 3/017 |

\* cited by examiner

*Primary Examiner* — Normin Abedin
(74) *Attorney, Agent, or Firm* — Griffiths & Seaton PLLC

(57) ABSTRACT

Various embodiments are provided for validating commands for hacking and spoofing prevention in an Internet of Things (IoT) computing environment by a processor. An eligibility of a user to issue a command to an IoT device may be cognitively determined according to a digital footprint and a location of the use. User intent may be established according to the digital footprint. The command issued to the IoT device may be validated according to the location of the user and the user intent.

20 Claims, 8 Drawing Sheets

VALIDATING COMMANDS FOR HACKING AND SPOOFING PREVENTION IN AN INTERNET OF THINGS (IOT) COMPUTING ENVIRONMENT

BACKGROUND OF THE INVENTION

Field of the Invention

The present invention relates in general to computing systems, and more particularly, to various embodiments for validating commands for hacking and spoofing prevention in an Internet of Things (IoT) computing environment using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information.

Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, these technological advances can be then brought to bear in everyday life.

SUMMARY OF THE INVENTION

Various embodiments are provided for validating commands for hacking and spoofing prevention in an Internet of Things (IoT) computing environment by a processor. An eligibility of a user to issue a command to an IoT device may be cognitively determined according to a digital footprint and a location of the use. User intent may be established according to the digital footprint. The command issued to the IoT device may be validated according to the location of the user and the user intent.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
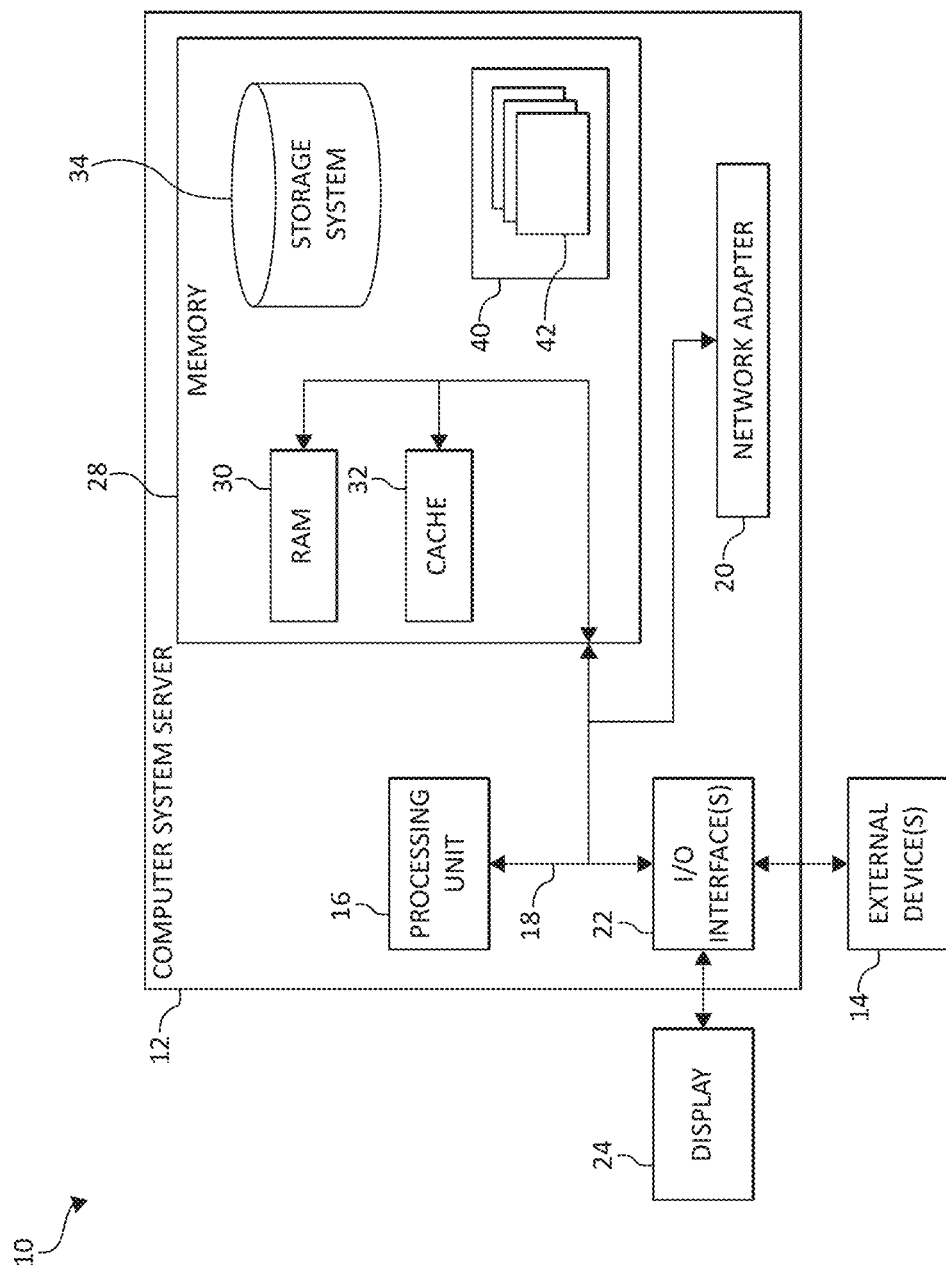
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, voice-activated devices, digital assistants, home appliances, audio systems, televisions, security cameras, security sensors, among countless other examples. Such IoT computing systems may be employed in a variety of settings.

For example, digital assistant device usage has dramatically increased over the past few years. Moreover, usage of always-on listening devices (e.g., voice-activated devices) has also increased in homes, buildings, and other types of structures or environments. Currently, however, digital assistants are unable to provide adequate security for the authorization of certain sensitive commands coming from users. For example, voice authorization can be hacked and spoofed with today's array of options regarding a digital reproduction of someone's voice and the alteration of voice commands. Accordingly, various embodiments provide a cognitive system that may validate commands issued by a user to the cognitive system to prevent hacking and spoofing in an Internet of Things (IoT) computing environment.

In one aspect, the present invention provides for a cognitive system that may employ one or more machine learning operations and learning capabilities to monitor and/or analyze a user's digital interactions over a selected period of time. The monitored digital interactions with one or more IoT devices may be referred to herein as a "digital footprints." In one aspect, the digital interactions constituting the digital footprints may include, for example, one or more online purchases, social media posts and associated text data/topics/subject matter, uploaded videos/photos taken by a user including the meta data of the videos/photos, physical/virtual point of sale ("POS") transactions, toll gate monitors, vehicle remote starts, and other activities associated with one or more IoT device. The cognitive system may combine the monitored and/or analyzed digital footprint with the user's physical location over a selected period of time. The physical location of the user and the digital footprint may be used to validate one or more artificial intelligence ("AI") commands issued by the user to one or more IoT devices (e.g., a digital assistant/voice-activated hub).

In an additional aspect, the eligibility of a user to issue a command to an IoT device may be determined according to a digital footprint and a location of use. User intent may be established according to the digital footprint. The command issued to the IoT device may be validated according to the location of the user and the user intent.

In one aspect, user intent may be an idea, plan, desire, and/or goal intended to be performed. User intent may be an intention, purpose, and/or state of mind that directs the user's actions toward a specific object. Moreover, user intent may include one or more purposes or goals expressed by a user. User intent may include intents that are categories that define what the user is trying to do. Also, user intent may be defined as a desired outcome, goal, problem, task, or other intent.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels and keywords to apply to observed behavior, authentication levels, commands, and use a knowledge domain or ontology to store the learned observed behavior, authentication levels, and commands. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems, as described herein, are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
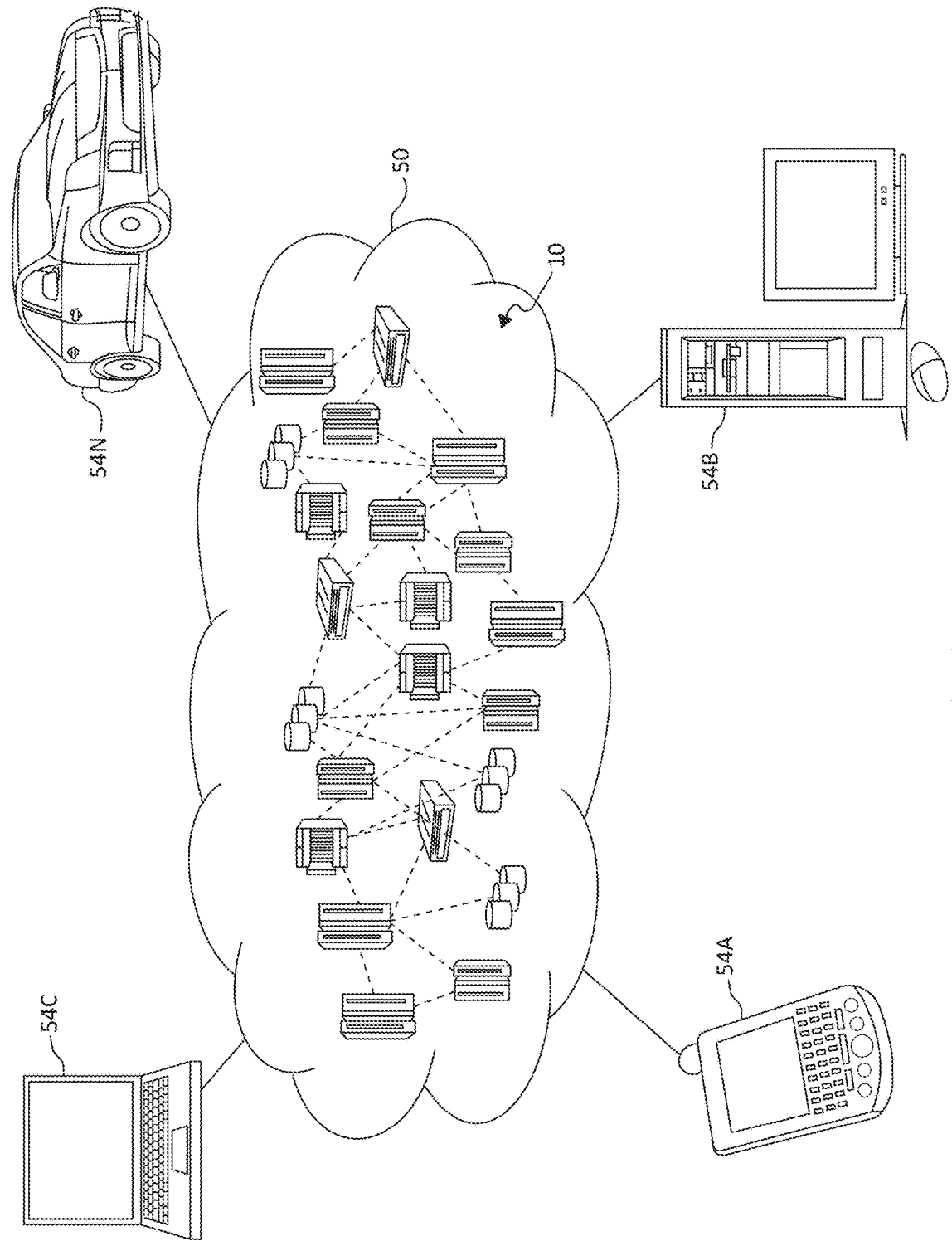
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
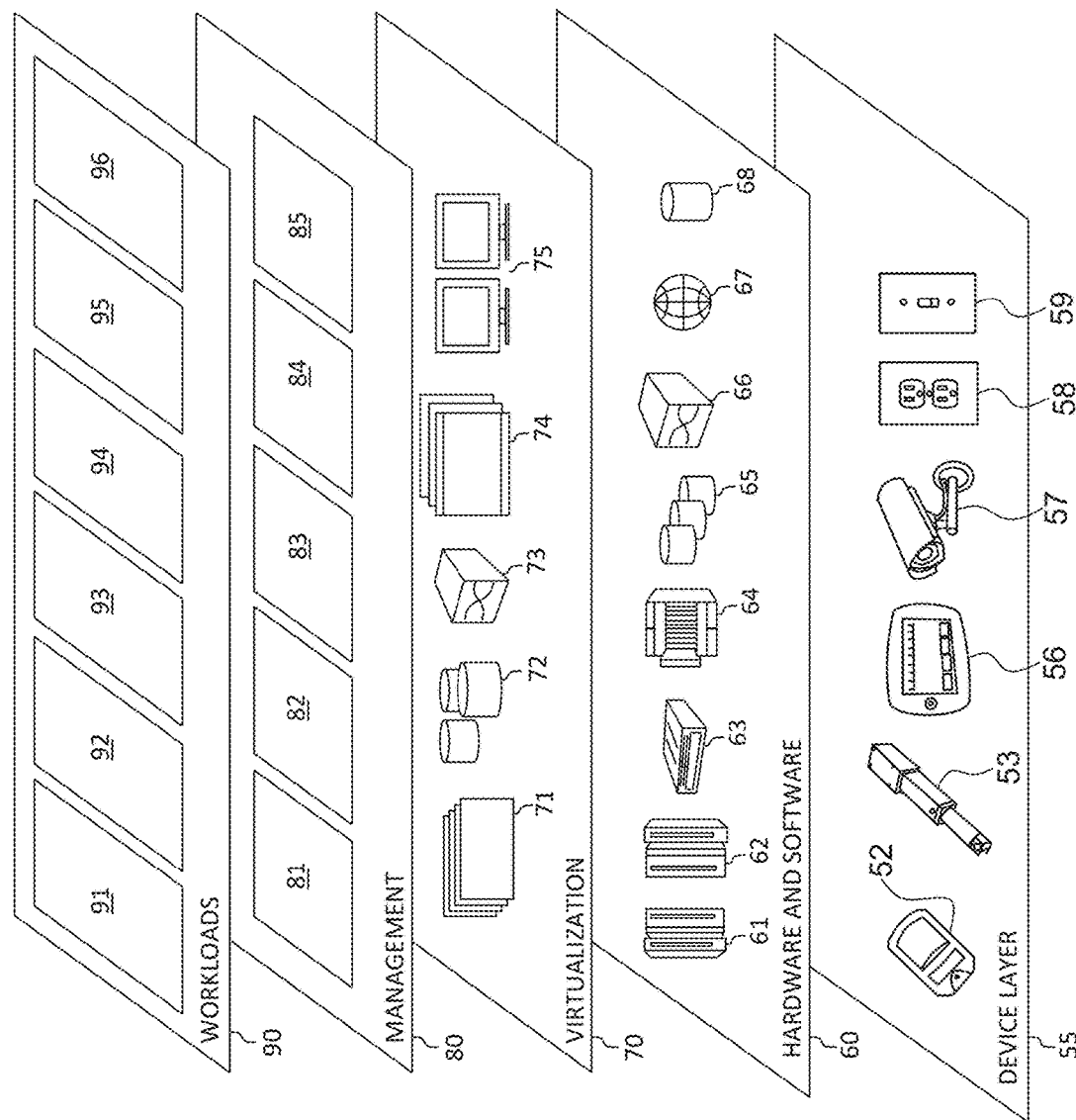
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for validating commands for hacking and spoofing prevention. In addition, the workloads and functions 96 for validating commands for hacking and spoofing prevention may include such operations as data analytics, data analysis, and as will be further described, notification functionality. One of ordinary skill in the art will appreciate that the workloads and functions 96 for validating commands for hacking and spoofing prevention may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for validating commands for hacking and spoofing prevention in an IoT computing environment. That is, spoken AI commands issued by a user may be validated in order to prevent hacking and spoofing consisting by: 1) analyzing a user's digital footprints and physical location in order to determine the eligibility the user to issue an AI command, 2) analyzing the meta-data of a user's digital footprints to establish user intent, and 3) validating an issued command against the users known virtual and physical location and intent.

Figure 4:
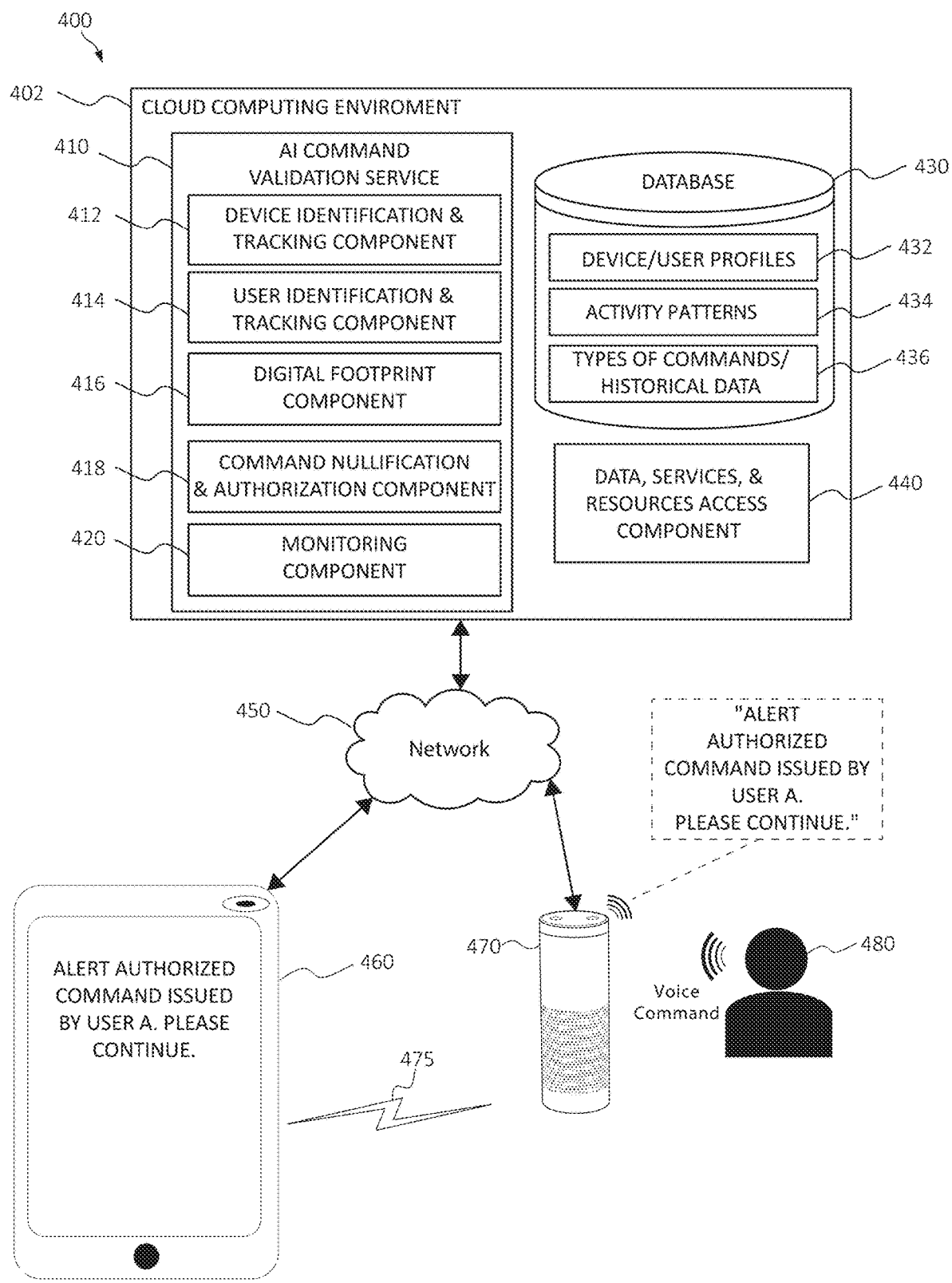
FIG. 4 is an additional block diagram depicting an exemplary functional relationship between various aspects of the present invention.

Turning now to FIG. 4, a block diagram depicting exemplary functional components of cognitive system 400 according to various mechanisms of the illustrated embodiments is shown. FIG. 4 illustrates functional components for validating commands for hacking and spoofing prevention in an IoT computing environment, such as a computing environment 402 (e.g., "cloud computing environment"). As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

The cognitive system 400 may include the cloud computing environment 402, an AI command validation service 410, one or more IoT devices such as, for example, IoT device 460 (e.g., a desktop computer, laptop computer, tablet, smartphone, and/or another electronic device that may have one or more processors and memory) and/or IoT device 470 (e.g., a digital assistant). The IoT device 460, the IoT device 470, the AI command validation service 410, and the computing environment 402 may each be associated with and/or in communication with each other, by one or more communication methods, such as a computing network 450.

In one aspect, the computing environment 402 may provide virtualized computing services (i.e., virtualized computing, virtualized storage, virtualized networking, etc.) to the IoT device 460 and/or the IoT device 470. More specifically, the computing environment 402 may provide virtualized computing, virtualized storage, virtualized networking and other virtualized services that are executing on a hardware substrate. In one aspect, the one or more IoT device 470 may communicate with the IoT device 460 using network 450. Also, the one or more IoT devices 470 may communicate with the IoT device 460 using one or more communication connections such as, for example, a Wi-Fi Internet connection 475.

As depicted in FIG. 4, the computing environment 402 may include the AI command validation service 410, a database 430, and/or a data, services, and resources access component 440. The database 430 may also include device/user profiles 432, one or more activity patterns 434, and types of commands/historical data 436 for the device 460, the IoT device 470, and/or the users 480. The database 430 may store, maintain, and update activity patterns that define one or more parameters for accessing data, services, and/or resources internal to and/or external to the cloud computing environment 402. The database 430 may store, maintain, and update device identification and authorization information and/or biometric identification (ID) data associated with the device/user profiles 432, such as, for example, voice data, fingerprint data, facial recognition data, and/or retinal data (or other biometric data).

In one aspect, the data, services, and resources access component 440 may assist in providing access to the data, services and/or resources (e.g., digital interactions with outside data sources, online services, and/or point of sale "POS" transaction agreement events). In one aspect, the data, services and/or resources may include, for example, but are not limited to, data content associated with a user, a device or a command, identifying a speaker during a conference call via audio or visual means, calendaring services, scheduling conference calls or meetings, a scheduling assistant, editing, executing a command (e.g., "digital assistant please order product 'X' from company B" or "digital assistant, please order more widgets from company C") and/or updating calendars and/or phone directories, generating and/or sending e-mails, creating, ordering, scheduling, performing, and/or modifying one or more actions, services, tasks, or services, and so forth. In other words, the one or more data, services, and resources may include data content, services, actions, tasks, or resources that may be predefined, identified, or authorized for the data, services, and resources access component 440 to access, schedule, execute, and/or use.

In one aspect, the one or more IoT devices 470 may communicate with the IoT device 460 using one or more communication connections such as, for example, a Wi-Fi Internet connection 475. The IoT device 460 and the IoT devices 470 may communicate with the cloud computing environment 402 via the network 450 to send a unique device identification (ID) sent from the IoT device 460 and/or an IoT identification (ID) that was received from the IoT device 470. That is, the device 460 and/or the IoT devices 470 may log into the computer environment 402, for the user 480, using various login credentials, which can include a user identification (ID), a unique device ID of the IoT device 460 and/or the IoT device ID received from the IoT device 470. The unique device ID of the IoT device 460 and/or the IoT device ID received from the IoT device 470 may be stored, maintained, and/or received in a device identification and tracking component 412 of the AI command validation service 410. The user ID may be stored, maintained, and/or received in a user identification and tracking component 414 of the AI command validation service 410.

The AI command validation service 410 may provide a device identification and tracking component 412, a user identification (ID) and tracking component 414, a digital footprint component 416, a command nullification and authorization component 418, and/or monitoring component 420.

The device identification and tracking component 412 may define, establish, and track a physical presence of the one or more users (and/or devices associated with the user 480) within a defined proximity with the IoT device 460 and/or IoT device 470. The device identification and tracking component 412 may define, establish, and track a virtual presence of the one or more users 480 associated with the IoT device 460 and/or IoT device 470.

The user ID and tracking component 414 may establish a physical or virtual awareness of user 480. Moreover, the user ID and tracking component 414 may also identify and authorize the user 480 for accessing, using, or executing a command in the cloud computing environment 402 for accessing data/content, services and/or resources provided by the data, services, and resources access component 440. For example, the user 480 may communicate voice commands to the IoT device 470. The cloud computing environment 402, in association with the IoT device 470, may identify the user 480 as the speaker (e.g., "speaker identification") or voice of the issued command. For example, using the embodiments described herein, the cloud computing environment 402 and/or the user ID and tracking component 414 can identify the user 480 speaking when one more persons connect from each customer's own device (e.g., laptop, tablet, phone) such as, for example, device 460 and/or via the IoT device 470. By establishing the authenticated identity, which may include the identification for each user, such as user 480, the cloud computing environment 402, the user ID and tracking component 414, and/or the IoT device 460/IoT device 470 (each having the authorized identity) can identify which user issued a voice command.

The command nullification and authorization component 418 may nullify and/or authorize a command issued to the IoT device 460 and/or to the IoT device 470 from a user such as, for example, user 480. Using database 430, a look-up operation may be performed by the command nullification and authorization component 418 to determine the type of command and/or access historical data relating to user 480. That is, when user 480 issues a command to the IoT device 460 and/or to the IoT device 470 a look up operation may be performed using database 430 to determine one or more user actions that lead to that event or events associated with the issued command.

The digital footprint component 416 may determine an eligibility of a user to issue a command to an IoT device according to a digital footprint and a location of the user. The digital footprint component 416 may establish user intent according to the digital footprint. The command nullification and authorization component 418 may validate the command issued to the IoT device according to the location of the user and the user intent.

The digital footprint component 416, in association with the device identification and tracking component 412 and the user identification and tracking component, may identify both the location of the user and the IoT device and analyze a physical distance between a current location of the user and the IoT device.

The digital footprint component 416, in association with the device identification and tracking component 412 and the user identification and tracking component 414, may determine an expected location of the user according to historical patterns, calendar data, one or more transaction agreements, or a combination thereof.

The monitoring component 420 may monitor the digital footprint of the user for identifying one or more action patterns leading to one or more events. The digital footprint component 416, in association with the monitoring component 420, may determine one or more user actions leading to one or more events associated with the issued command. The digital footprint component 416, in association with the monitoring component 420, may establish the user intent upon one or more user actions associated with the command occurring during a selected time period prior to issuing the command.

The digital footprint component 416 may include machine learning operation functionality to identify and learn the user intent and the location of the user and the IoT device according to historical patterns of the user, behavior patterns of the user, biometric data, calendar data, one or more transaction agreements, physical or virtual locations of the user and the IoT device, analyzed data from a plurality of IoT devices, or a combination thereof.

In view of the foregoing components and functionality of FIG. 4, consider the following operational steps.

In step 1), the IoT device 460 (e.g., smart phone) and/or IoT device 470 (e.g., digital assistance) may be in a listening state to detect a "wake command" for activating or exiting a sleeping mode of the IoT device 460 and/or IoT device 470 to an awake mode (e.g., detect a wake command).

In step 2) data may be collected to acquire a location of the user 480 and the location, direction, and range of the issued voice command. The issued command and collected data may be analyzed using a natural language processing ("NLP"), lexical analysis, parsing, extraction of concepts, semantic analysis, or a combination thereof.

In step 3), a contextual analysis may be performed. User authentication may be performed using biometric analysis. For example, voice recognition may be performed and/or a previously performed voice recognition operation may be used to recognize the requested command. A user's current location may be compared with learned/known behaviors, activities of daily living ("ADLs), habits, and/or historical data relating to the current location, or combination thereof, which may be unique to each verified and authenticated user.

Step 3 may also include several sub steps such as, for example, sub step 3A and sub step 3B.

In sub step 3A), the AI command validation service 410 may analyze the user's digital footprint(s) and physical location in order to determine the user's eligibility to issue an AI command. The AI command validation service 410 may identify the location of the user. For example, one or more transaction agreements (e.g., financial purchases using an electronic payment system) PoS transactions, and/or IoT transaction/logs associated locations may be scanned to identify the user (e.g., user just scanned credit card at local hardware store). Additionally, the AI command validation service 410 may scan, parse, and/or analyze calendar information and mine a location field as well as using one or more machine learning operations to analyze meeting, topics, events, titles/descriptions and prior meetings for context. The machine learning operations may include one or more AI or NLP instances. These instances may include, for example, IBM® Watson® such as Watson® Analytics. (IBM® and Watson® are trademarks of International Business Machines Corporation).

The user's location may be collected from one or more IoT devices such as for example, IoT device 460 (e.g., a mobile device). The location of the digital assistant such as, for example, IoT device 470, may be identified such as, for example, by verifying a known internet protocol ("IP") address routing mechanisms). The physical distance from the user's current location (e.g., user 480) to the digital assistant such as, for example, IoT device 470 may be analyzed and determined. In one aspect, based on the determined distance between the user and the digital assistance, an error alert/anomaly may be issued if the determined distance between the user and the digital assistance is greater than a defined threshold in relation to a last known location.

The user's expected location may also be determined and/or analyzed based on historical patterns (e.g., historical purchases, behaviors, ADLs, historical activities, etc.) If no anomalies are detected then the issued AI command may be verified (e.g., passes the eligibility test). For example, the AI command validation service 410 may issue to one or more IoT devices (e.g., IoT device 460 and/or IoT device 470) such as, for example, using a graphical user interface and/or an audible communication of "Alert. Authorized command issued by User A. Please continue."

In sub step 3B), the AI command validation service 410 may analyze the meta-data of a user's digital footprints to establish user intent. For example, the AI command validation service 410 may monitor a digital footprint for one or more user to identify one or more patterns that lead to action. For example, user 480 may always research a product for a defined time period (e.g., 30 minutes) prior to purchasing a product from an online retailer. As an additional example, user 480 may abstain from purchasing "fast food" unless user 480 first receives a discount offer (e.g., coupon) via the fast food company's mobile application. Thus, each of these activities, behaviors, and/or patterns may be stored/logged in database 430. Thus, when user 480 issues a command, a look up operation may be performed to look up that specific command in the database 430 to determine the user actions that are associated with and/or lead to that event. In one aspect, the event may be the issuing of a command. If expected activities relating to the issued command have not occurred prior to and within a specific time frame, then the intent of user 480 is not established. If expected activities have occurred prior to and within the specific time frame, then the intent of user 480 may be established. Also, the user intent may also be evaluated by detecting pattern outliers that are outside of a standard/normal behavior of a selected/unique user. For example, if an owning adult user were to only use the device at night time to pay the bills, then the payment of bills at a scheduled time may be a pattern. A pattern outlier may be an identified behavior inconsistent with an identified or standard pattern of behavior such as, for example, if a person might try to transfer a large amount of money at a scheduled time in the morning (e.g., 8:00 a.m.) that is outside of an identified or standard pattern of behavior of transferring a large amount of money in the evening (e.g., 5:00 p.m.)

In step 4), the AI command validation service 410 may validating the command issued to the IoT device according to the location of the user and the user intent. In one aspect, the AI command validation service 410 may provide the user with a verification/authorization complete status (e.g., a formal system authorization completion status). Upon the issued command being verified and accepted, the command may be processed and the issued "wake word" may be accepted as valid, accurate, and acceptable. Upon the issued command being unverified and unaccepted/nullified, the command may be ignored, questioned and/or challenged (e.g., provide an interactive series of authentication questions) for further authentication if the user indicates an intent to proceed with additional authentication (e.g., a two-step authentication operation).

Figure 5:
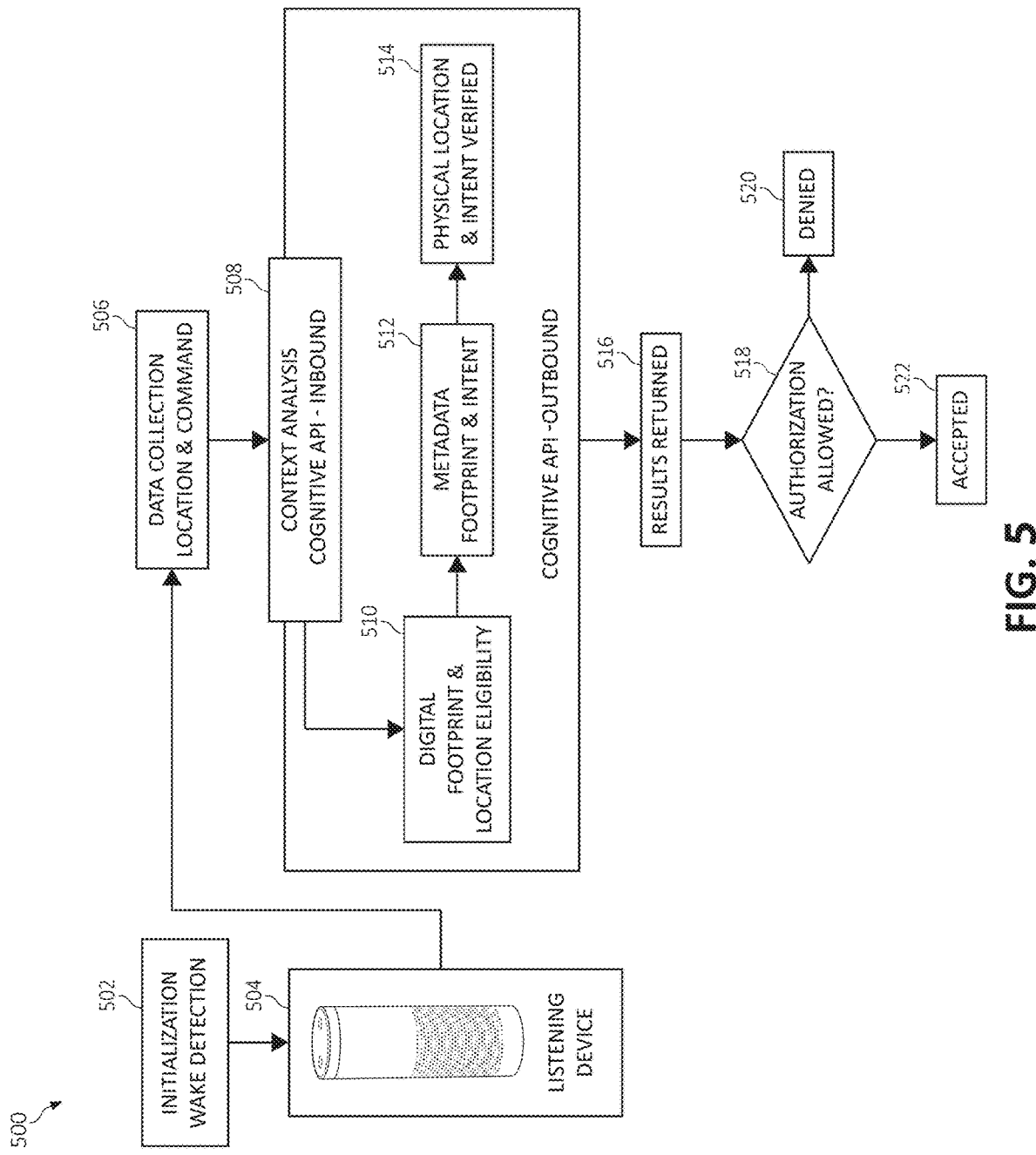
FIG. 5 is a block/flow diagram for validating commands using a digital footprint and location information for hacking and spoofing prevention in an Internet of Things (IoT) computing environment in accordance with an embodiment of the present invention.

Turning now to FIG. 5, a block diagram of exemplary functionality 500 relating to validating commands using a digital footprint and location information for hacking and spoofing prevention is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for image enhancement in accordance with the present invention such as, for example, hardware and software components of FIG. 4. Many of the functional blocks 500 may execute as background processes on various components, either in distributed computing components, or on the user device, or elsewhere.

Starting with block 502, an initialization operation (e.g., a wake detection operation) may be performed on an IoT device (e.g., IoT device 504 "listening device"). That is, a context and scope may be defined for commands to be allowed or denied within an IoT device 504 (e.g., a digital assistant interface). Furthermore, the IoT device 504 may also monitor, determine, listen and/or identify each user that may enter or comes within a defined proximity (e.g., a "voice distance") based on one or more criteria. Furthermore, an initialization set up may be performed for each new user or upon first time usage of an IoT device 504 by a user.

Data may be collected for each location and the issued command, as in block 506. Turning now to block 508, a context analysis (see step 3 of FIG. 4) may be performed on the data received (e.g., from block 506) using one or more machine learning operations. A user's digital footprint and physical location may be analyzed in order to determine the user's eligibility to issue an AI command (see sub-step 3A of FIG. 4), as in block 510. The meta-data of a user's digital footprint(s) may be analyzed to establish user intent (see sub step 3B of FIG. 4), as in block 512. A physical location and user intent may be verified (and/or unverified), as in block 514.

As in block 516, verification result (e.g., authorization allowed or not allowed) may be provided (e.g., returned to the IoT device 504). A determination operation may be performed to determine if the authorization was allowed (or nullified), as in block 518. That is, the verification for execution of the command may be allowed, denied, and/or changed. If the command is allowed for the user, the user may be allowed to access or reference the content, services, and/or resources for the command, as in block 522. If the command is denied for the user, the user is restricted from accessing and/or not allowed to access the content, services, and/or resources associated with the issued command, as in block 520.

Figure 6:
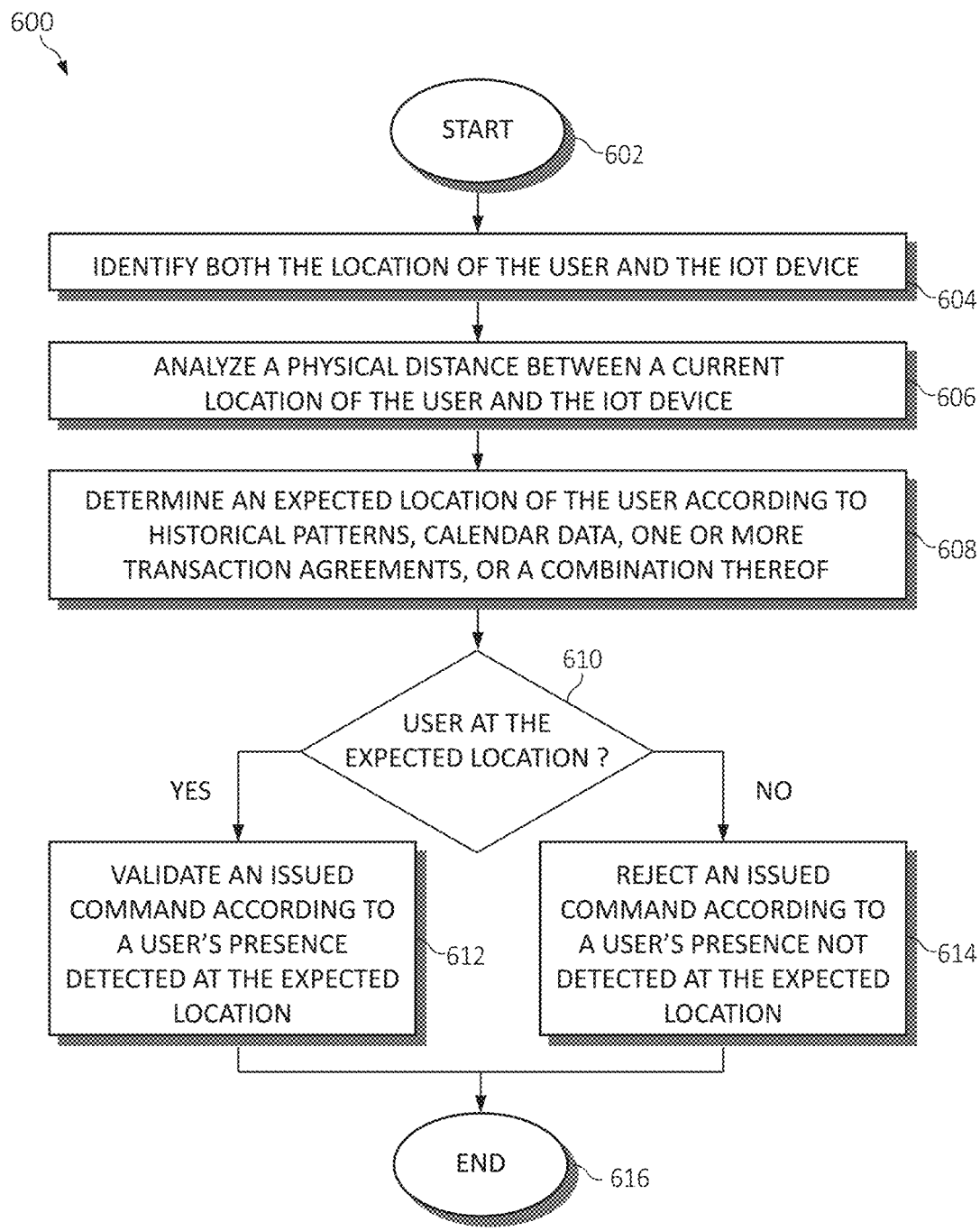
FIG. 6 is a flowchart diagram depicting an exemplary method for analyzing a digital footprint and a location of a user for validating commands for hacking and spoofing prevention in an Internet of Things (IoT) computing environment in accordance with an embodiment of the present invention.

Turning now to FIG. 6, a method 600 is illustrated for analyzing a digital footprint and a location of a user for validating commands for hacking and spoofing prevention in an Internet of Things (IoT) computing environment, in which various aspects of the illustrated embodiments may be implemented. The functionality 600 may be implemented as a method executed as instructions on a machine, where the instructions are included on at least one computer readable medium or on a non-transitory machine-readable storage medium.

The functionality 600 may start in block 602. A location (e.g., physical and/or virtual location) of the user and the IoT device may be identified, as in block 604. A physical distance between a current location of the user and the IoT device may be determined, as in block 606. An expected location of the user may be determined according to historical patterns, calendar data, one or more transaction agreements, or a combination thereof, as in block 608. A determination operation may be executed for determining if the physical presence of the user at the expected location, as in decision step 610. If no at decision step 610, the issued command may be rejected according to the user's presence not detected at the expected location, as in block 612. If yes at decision step 610, the issued command may be validated according to a user's presence detected at the expected location, as in block 614. From both blocks 612 and 614, the method 600 may move to block 616. The functionality 600 may end in block 616.

Figure 7:
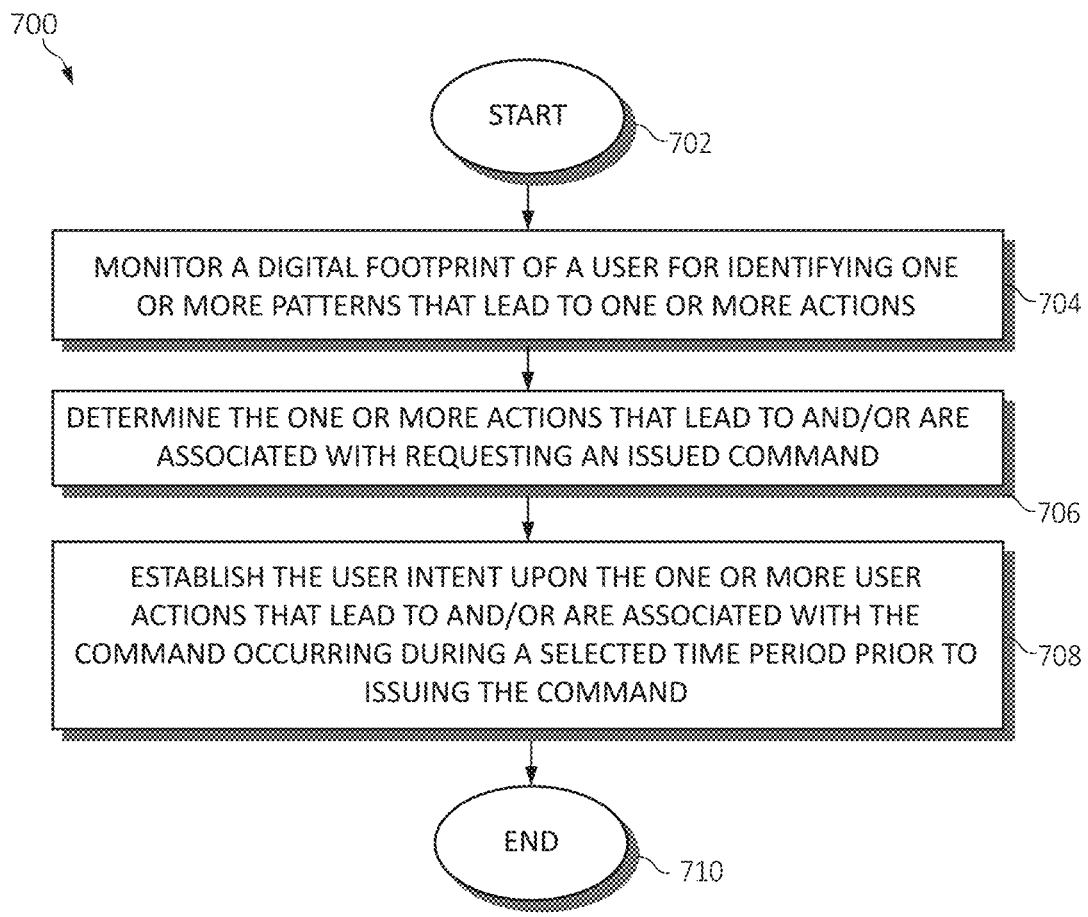
FIG. 7 is a flowchart diagram depicting an exemplary method for analyzing metadata of the digital signature to establish user intent in an Internet of Things (IoT) computing environment in accordance with an embodiment of the present invention.

Turning now to FIG. 7, an additional method 700 is illustrated for analyzing metadata of the digital signature to establish user intent, in which various aspects of the illustrated embodiments may be implemented. The functionality 700 may be implemented as a method executed as instructions on a machine, where the instructions are included on at least one computer readable medium or on a non-transitory machine-readable storage medium.

The functionality 700 may start in block 702. A digital footprint of a user may be monitored for identifying one or more patterns that lead to one or more actions, as in block 704. The one or more actions that lead to and/or are associated with requesting an issued command may be determined (according to the monitoring), as in block 706. The user intent may be established upon the one or more user actions that lead to and/or are associated with the command occurring during a selected time period prior to issuing the command, as in block 708. The functionality 700 may end in block 710.

Figure 8:
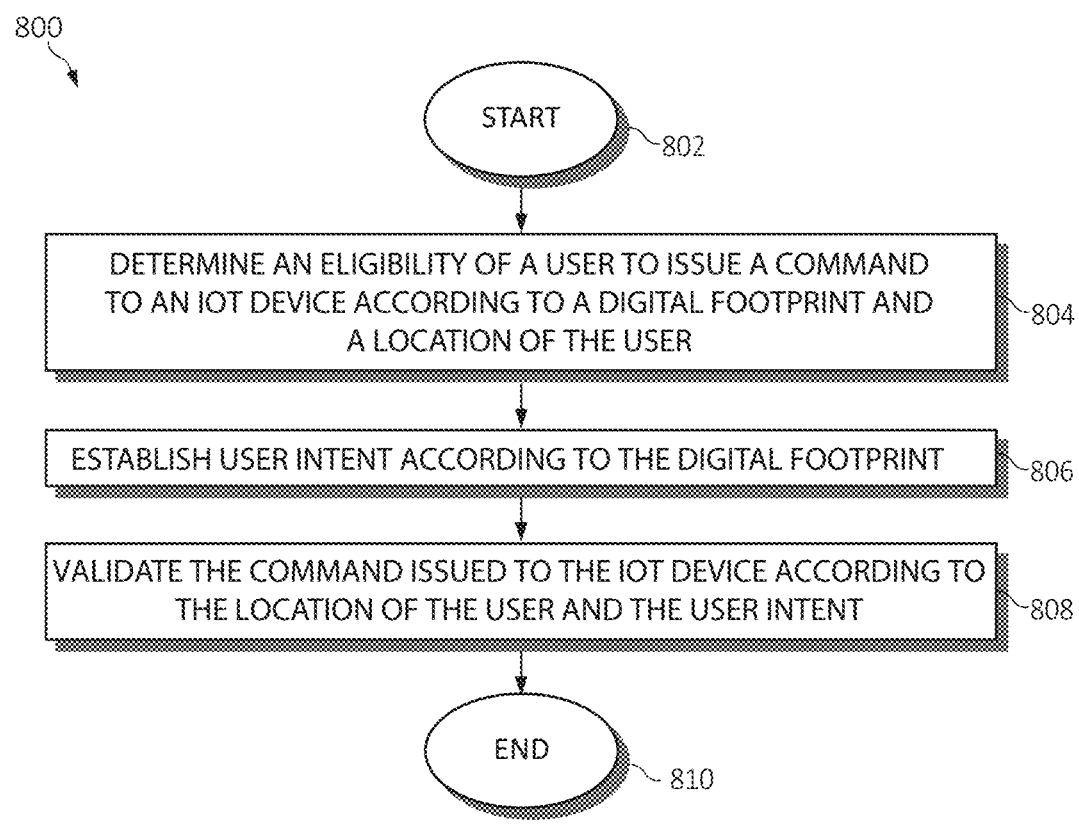
FIG. 8 is a flowchart diagram depicting an exemplary method for validating commands for hacking and spoofing prevention in an Internet of Things (IoT) computing environment in accordance with an embodiment of the present invention.

Turning now to FIG. 8, an additional method 800 is illustrated for validating commands for hacking and spoofing prevention in an Internet of Things (IoT) computing environment, in which various aspects of the illustrated embodiments may be implemented. The functionality 800 may be implemented as a method executed as instructions on a machine, where the instructions are included on at least one computer readable medium or on a non-transitory machine-readable storage medium.

The functionality 800 may start in block 802. An eligibility of a user to issue a command to an IoT device may be determined according to a digital footprint and a location of the use, as in block 804. User intent may be established according to the digital footprint, as in block 806. The command issued to the IoT device may be validated according to the location of the user and the user intent, as in block 808. The functionality 800 may end in block 810.

In one aspect, in conjunction with and/or as part of at least one block of FIGS. 6-8, the operations of 600, 700, and/or 800 may include each of the following. The operations of 600, 700, and/or 800 may define an authorized command to an authorization level according to a sensitivity level or define an authorized command to an authorization level according to a category. The assigned authorization level may be determined for the one or more users issuing the command to the IoT device. A new user may be assigned to either a default authorization level or a selected authorization level in the hierarchy of authorization levels according to an authentication operation.

The operations of 600, 700, and/or 800 may define and track a physical presence of the one or more users within a defined proximity with the IoT device, and/or define and track a virtual presence of the one or more users with the IoT device.

The operations of 600, 700, and/or 800 may suspend or restrict the assigned authorization level in the hierarchy of authorization levels according to a plurality of defined rules and policies, and/or promote or demote the one or more users to a different authorization level in the hierarchy of authorization levels according to a plurality of defined rules and policies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for validating commands for hacking and spoofing prevention in an Internet of Things (IoT) computing environment, comprising:
   determining an eligibility of a user to issue a command to an IoT device according to a digital footprint and a location of the user;
   establishing user intent according to the digital footprint; and
   validating the command issued to the IoT device according to the location of the user and the user intent; wherein validating the command further includes determining an expected location of the user based on the digital footprint, and comparing the expected location of the user to the location of the user, and wherein the command is validated according to whether an anomaly exists during the comparison of the expected location of the user to the location of the user.

2. The method of claim 1, further including:
   identifying both the location of the user and the IoT device; and
   analyzing a physical distance between a current location of the user and the IoT device.

3. The method of claim 1, further including determining the expected location of the user according to historical patterns, calendar data, one or more transaction agreements, or a combination thereof.

4. The method of claim 1, further including monitoring the digital footprint of the user for identifying one or more action patterns leading to one or more events.

5. The method of claim 1, further including determining one or more user actions leading to one or more events associated with the issued command.

6. The method of claim 1, further including establishing the user intent upon one or more user actions associated with the command occurring during a selected time period prior to issuing the command.

7. The method of claim 1, further including implementing a machine learning operation to identify and learn the user intent and the location of the user and the IoT device according to historical patterns of the user, behavior patterns of the user, biometric data, calendar data, one or more transaction agreements, physical or virtual locations of the user and the IoT device, analyzed data from a plurality of IoT devices, or a combination thereof.

8. A system, for validating commands for hacking and spoofing prevention in an Internet of Things (IoT) computing environment, comprising:
one or more processors with executable instructions that when executed cause the system to:
determine an eligibility of a user to issue a command to an IoT device according to a digital footprint and a location of the user;
establish user intent according to the digital footprint; and
validate the command issued to the IoT device according to the location of the user and the user intent; wherein validating the command further includes determining an expected location of the user based on the digital footprint, and comparing the expected location of the user to the location of the user, and wherein the command is validated according to whether an anomaly exists during the comparison of the expected location of the user to the location of the user.

9. The system of claim 8, wherein the executable instructions further:
identify both the location of the user and the IoT device; and
analyze a physical distance between a current location of the user and the IoT device.

10. The system of claim 8, wherein the executable instructions further determine the expected location of the user according to historical patterns, calendar data, one or more transaction agreements, or a combination thereof.

11. The system of claim 8, wherein the executable instructions further monitor the digital footprint of the user for identifying one or more action patterns leading to one or more events.

12. The system of claim 8, wherein the executable instructions further determine one or more user actions leading to one or more events associated with the issued command.

13. The system of claim 8, wherein the executable instructions further establish the user intent upon one or more user actions associated with the command occurring during a selected time period prior to issuing the command.

14. The system of claim 8, wherein the executable instructions further implement a machine learning operation to identify and learn the user intent and the location of the user and the IoT device according to historical patterns of the user, behavior patterns of the user, biometric data, calendar data, one or more transaction agreements, physical or virtual locations of the user and the IoT device, analyzed data from a plurality of IoT devices, or a combination thereof.

15. A computer program product for, by one or more processors, validating commands for hacking and spoofing prevention in an Internet of Things (IoT) computing environment, the computer program product comprising a non-transitory computer-readable storage medium having computer-readable program code portions stored therein, the computer-readable program code portions comprising:
an executable portion that determines an eligibility of a user to issue a command to an IoT device according to a digital footprint and a location of the user;
an executable portion that establishes user intent according to the digital footprint; and
an executable portion that validates the command issued to the IoT device according to the location of the user and the user intent; wherein validating the command further includes determining an expected location of the user based on the digital footprint, and comparing the expected location of the user to the location of the user, and wherein the command is validated according to whether an anomaly exists during the comparison of the expected location of the user to the location of the user.

16. The computer program product of claim 15, further including an executable portion that:
identifies both the location of the user and the IoT device; and
analyzes a physical distance between a current location of the user and the IoT device; and
determines the expected location of the user according to historical patterns, calendar data, one or more transaction agreements, or a combination thereof.

17. The computer program product of claim 15, further including an executable portion that monitors the digital footprint of the user for identifying one or more action patterns leading to one or more events.

18. The computer program product of claim 15, further including an executable portion that determines one or more user actions leading to one or more events associated with the issued command.

19. The computer program product of claim 15, further including an executable portion that establishes the user intent upon one or more user actions associated with the command occurring during a selected time period prior to issuing the command.

20. The computer program product of claim 15, further including an executable portion that implements a machine learning operation to identify and learn the user intent and the location of the user and the IoT device according to historical patterns of the user, behavior patterns of the user, biometric data, calendar data, one or more transaction agreements, physical or virtual locations of the user and the IoT device, analyzed data from a plurality of IoT devices, or a combination thereof.

* * * * *